United States Patent
Ito et al.

(10) Patent No.: US 6,976,760 B2
(45) Date of Patent: Dec. 20, 2005

(54) PROJECTOR HAVING A COOLING PASSAGE THAT COOLS THE LIGHT SOURCE AND OUTER CASE

(75) Inventors: Shinsuke Ito, Shiojiri (JP); Takeshi Takizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 233 days.

(21) Appl. No.: 10/000,309

(22) Filed: Dec. 4, 2001

(65) Prior Publication Data

US 2002/0071061 A1  Jun. 13, 2002

(30) Foreign Application Priority Data

Dec. 8, 2000  (JP)  ............................ 2000-374439

(51) Int. Cl.$^7$ ........................ G03B 21/16; G03B 21/18; G03B 21/14; F21V 29/00; F21V 7/20
(52) U.S. Cl. ............................ 353/61; 353/52; 353/60; 353/119; 362/294; 362/345; 362/373
(58) Field of Search .............................. 353/52, 57–58, 353/20, 60–61, 119; 362/218, 294, 345, 373

(56) References Cited

U.S. PATENT DOCUMENTS

| 6,231,191 B1 * | 5/2001 | Shiraishi et al. ............... 353/61 |
| 6,280,038 B1 * | 8/2001 | Fuse et al. ..................... 353/57 |
| 6,290,360 B1 * | 9/2001 | Konuma et al. ............... 353/61 |
| 6,334,686 B1 * | 1/2002 | Shiraishi et al. ............... 353/57 |
| 6,364,492 B1 * | 4/2002 | Fujimori et al. ............. 353/119 |
| 6,398,366 B1 * | 6/2002 | Hara et al. ..................... 353/57 |
| 6,540,364 B2 * | 4/2003 | Takizawa et al. ............. 353/61 |
| 6,558,004 B2 * | 5/2003 | Ito et al. ....................... 353/57 |
| 6,561,650 B2 * | 5/2003 | Ito et al. ....................... 353/20 |
| 6,582,083 B2 * | 6/2003 | Shiraishi et al. ............... 353/57 |
| 6,637,895 B2 * | 10/2003 | Fujimori et al. ............. 353/119 |

FOREIGN PATENT DOCUMENTS

| JP | A 8-304739 | 11/1996 |
| JP | 11-119342 A | 4/1999 |

* cited by examiner

*Primary Examiner*—Judy Nguyen
*Assistant Examiner*—Magda Cruz
(74) *Attorney, Agent, or Firm*—Oliff & Berridge, PLC (57) ABSTRACT

The invention provides a projector that is capable of efficiently cooling an outer case along with a light source device. The projector includes an outer case that accommodates a light source device and a cooling passage that is formed in the vicinity of the light source device to cool the outer case. Therefore, the inside of the outer case and the vicinity of the light source device are cooled by the cooling passage so as to cool the outer case efficiently. Also, since the cooling passage is arranged in the vicinity of the light source device, the light source device can also efficiently be cooled. As a result, a temperature rise in the light source device can be restrained so as to cool the outer case more efficiently.

6 Claims, 12 Drawing Sheets

PROJECTOR HAVING A COOLING PASSAGE THAT COOLS THE LIGHT SOURCE AND OUTER CASE

BACKGROUND OF THE INVENTION

1. Field of Invention

The present invention relates to a projector for forming a projected image by magnifying and projecting luminous flux emitted from a light source device after the luminous flux is modulated.

2. Description of Related Art

Recently, projectors have been used in a greater variety of environments. In addition to using projectors for presentations in office meetings or meetings on business trips, projectors are also used at technical meetings in research and development divisions for capturing CAD/CAM/CAE data therein in order to magnify and project the data, for example. Projectors are also used at various seminars and learning courses, as well as in school classes where audiovisual education is performed. Projectors are also used for studying therapeutic methods and for performing medical guidance by projecting medical images and data, such as CT scans and MRI. Projectors are also used for efficiently addressing exhibitions or conventions in which a number of people are gathered.

Projectors must satisfy various specifications and functions since they are presently being used in various diverse environments. This creates a need for various types of projectors, such as light-weight compact models enhancing portability, high-luminance and high-resolution models enhancing image quality, and value-added models capable of being connected to various digital equipment and mobile tools.

Since it is foreseeable that environments in which projectors are used will become even more common and diverse, more advanced value-added projectors are being vigorously developed in light of the new environments in which projectors will be used.

The projectors discussed above include a cooling structure for cooling with cooling air a heat-generating source, such as a light-source lamp, a power-supply unit, and a liquid-crystal panel.

For example, in a related art projector, cooling air is supplied from an air-inlet formed on an outer case by an air-intake fan, and it is exhausted to the exterior of the projector from an air-outlet of the outer case by an exhaust fan after passing through the heat-generating source. In this case, a sirocco fan may be arranged inside the outer case, and cooling air may be blown on the lamp by the sirocco fan so as to be exhausted to the exterior of the case by the exhaust fan.

In such a structure, a lamp-cooling fan that is disposed in the vicinity of the light-source lamp has a rather larger size compared to air-intake fans for cooling other heat-generating sources or an exhaust fan, so that the entire light-source lamp, which is most liable to reach a high temperature in heat-generating sources, is securely cooled by a large amount of air-flow.

SUMMARY OF THE INVENTION

Cooling air is blown on the light-source lamp of a light-source device by using the sirocco fan in the structure mentioned above. However, since the cooling air is exhausted via a ballast (lamp-driving circuit), the cooling air is warmed while passing through the ballast, so that a sufficient cooling effect cannot be obtained.

In particular, the cooling air is to cool only the light-source lamp, so that part of the outer case in the vicinity of the light-source lamp is insufficiently cooled. As a consequence, heat is produced in the vicinity of the light-source lamp, thereby posing a problem that the outer case is heated up.

Metallic outer cases are currently being used more frequently so as to enhance the recycling of resources. This requires the use of a sufficient heat-control measure for such outer cases.

It is an object of the present invention to provide a projector that is capable of efficiently cooling a light-source device along with an outer case.

A projector according to the present invention includes a light source device and an outer case that accommodates the light source device. Luminous flux emitted from the light source device is magnified and projected so as to form a projected image after being modulated. A cooling passage to cool the outer case and the light source device is formed in the vicinity of the light source device in the outer case.

According to the present invention, a portion of the outer case in the vicinity of the light source device, which is most liable to reach a high temperature, is cooled by the cooling passage, resulting in effective cooling of the outer case. Since the cooling passage is arranged in the vicinity of the light source device, the light source device is also cooled efficiently. Consequently, a temperature rise in the light source device is restrained, and also the outer case can be more efficiently cooled, resulting in achievement of the object of the present invention.

According to the present invention, the cooling passage may be arranged inside or outside of the outer case as long as it can cool the outer case in the vicinity of the light source device. The configuration of the cooling passage is not limited, and any structure may be used. For example, while a cooling duct is arranged on an inner side face of the outer case, an inlet hole of the cooling duct may be formed so as to take cooling air from the outside of the outer case and to blow the cooling air toward an inner side face of the outer case from a discharge hole of the cooling duct. Moreover, inside the cooling duct, a centrifugal fan, such as a sirocco fan, may be arranged in a manner such that an exhaust hole is arranged along an inner side face of the cooling duct so as to form the cooling passage by the cooling air blown from the centrifugal fan or to form the cooling passage by connecting the centrifugal fan and the cooling duct.

In a projector according to the present invention, it is preferable that the cooling passage be formed by cooling air being blown out of a cooling duct arranged inside the outer case. A cooling air inlet hole of the cooling duct is capable of taking cooling air from the outside of the outer case, and a discharge hole of the cooling duct has an opening formed to directly blow the cooling air on an internal side face of the outer case.

In such a structure, since the cooling passage is formed by the cooling air blown from the cooling duct, the cooling air is securely fed thereby to cool the outer case efficiently. The discharge hole of the cooling duct has an opening formed to directly blow the cooling air on an internal side face of the outer case, so that the outer case can be more efficiently cooled.

In a projector according to the present invention, a restrictor is preferably formed in the upstream side of the opening of the cooling duct.

In such a structure, since the restrictor is formed in the cooling passage, blast pressure is increased, enabling the cooling air to be forcefully blown to the inside of the outer case, such that the outer case is efficiently cooled.

In a projector according to the present invention, preferably, the cooling air inlet hole of the cooling duct is divided into two directions of a first passage and a second passage. The first passage cools the inside of a light source lamp of the light source device, while the second passage is capable of cooling an outer peripheral portion of the light source lamp and the internal side face of the outer case.

In such a structure, one of the two divided passages cools the inside of the light source lamp, while the other cools the outer peripheral portion of the light source lamp and the inside of the outer case, so that the outer case is cooled along with the light source lamp, thereby cooling the outer case efficiently.

In a projector according to the present invention, the cooling duct may be preferably provided with a guide section formed in one piece that leads the cooling air to the inside and the outer peripheral portion of the light source lamp of the light source device.

In such a structure, cooling air is taken inside the light source lamp by the guide section to cool the inside, while the outer peripheral portion of the light source lamp is cooled by the cooling air, so that the light source lamp can securely be cooled. The heat in the light source lamp may not consequently be transferred to the outer case, so that the outer case is prevented from becoming hot.

In a projector according to the present invention, an air inlet hole that receives external cooling air may be preferably formed on a side face of the outer case and in the vicinity of the cooling air inlet hole of the cooling duct.

In such a structure, cooling air is also taken from the air inlet hole formed in the vicinity of the cooling air inlet hole of the cooling duct, and the cooling air flows so as to follow the cooling passage from the cooling duct, so that air volume increases, thereby cooling the outer case more efficiently.

A projector according to the present invention may preferably further include a centrifugal fan which is connected to the cooling duct in the side of the cooling air inlet hole.

In such a structure, the centrifugal fan is connected to the cooling duct, so that cooling air is fed to the cooling duct by the centrifugal fan. Therefore, the cooling air can be forcefully supplied so as to cool the outer case more efficiently.

In a projector according to the present invention, it is preferable that the centrifugal fan is a sirocco fan disposed on an internal side face of the outer case, and the exhaust fan is arranged on a side face perpendicular to the internal side face of the outer case to exhaust the cooling air that has been received from the sirocco fan and the cooling duct and cooled the outer case.

In such a structure, the cooling air fed from the sirocco fan and the cooling duct is exhausted by the exhaust fan that is arranged perpendicularly to the cooling duct, so that the cooling passage can be more securely formed, whereby the cooling air is promptly exhausted and the outer case is cooled more efficiently.

DETAILED DESCRIPTION OF PREFERRED EMBODIMENTS

An embodiment of the present invention will be described below with reference to the drawings.

Figure 1:
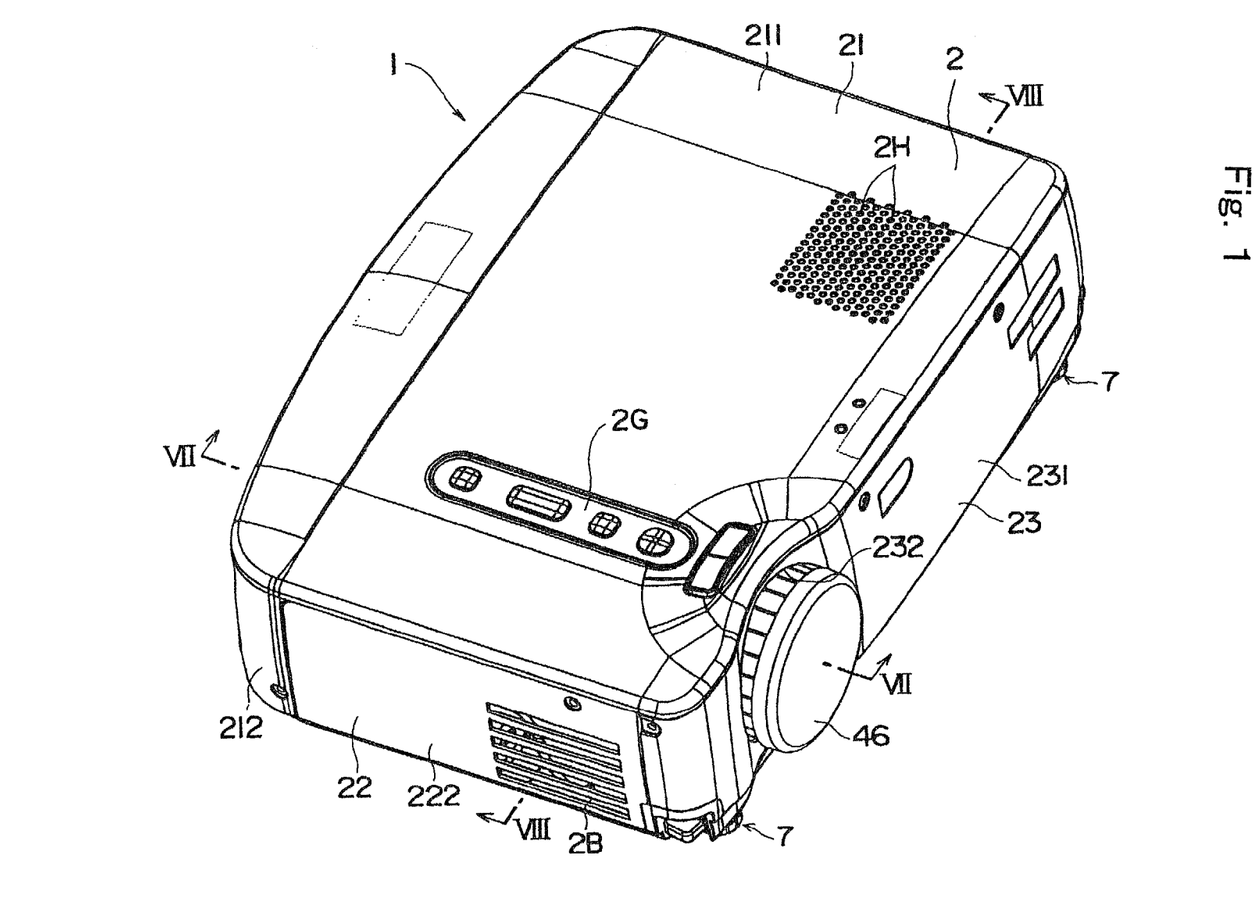
FIG. 1 is a perspective view of a projector according to an embodiment of the present invention as viewed from the top of the projector.
Figure 2:
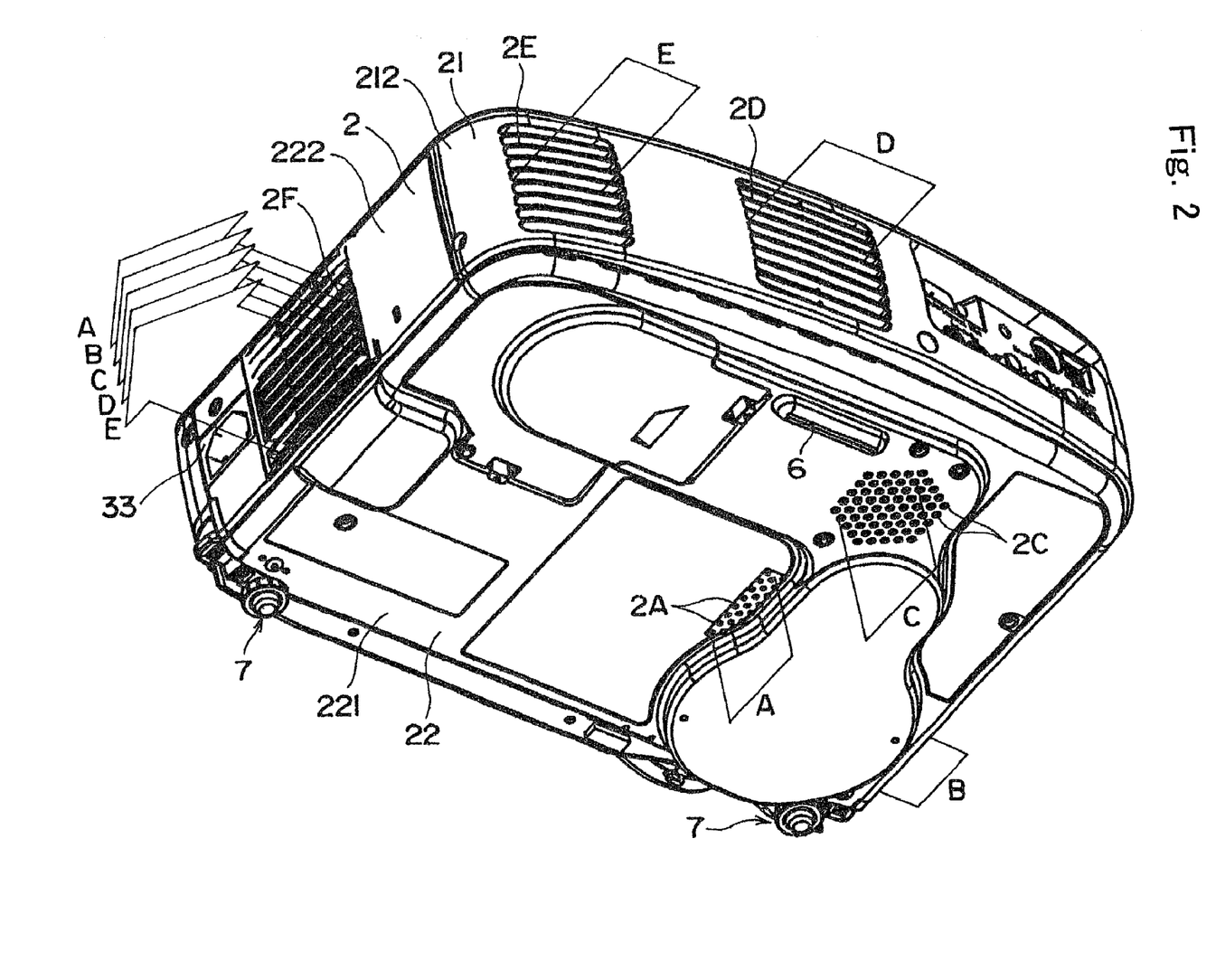
FIG. 2 is a perspective view of the projector as viewed from the bottom of the projector.

FIG. 1 is a perspective view of a projector 1 according to the embodiment as viewed from the top of the projector; FIG. 2 is a perspective view of the projector 1 as viewed from the bottom of the projector; and FIG. 3 is a perspective view illustrating the inside of the projector 1.

Figure 3:
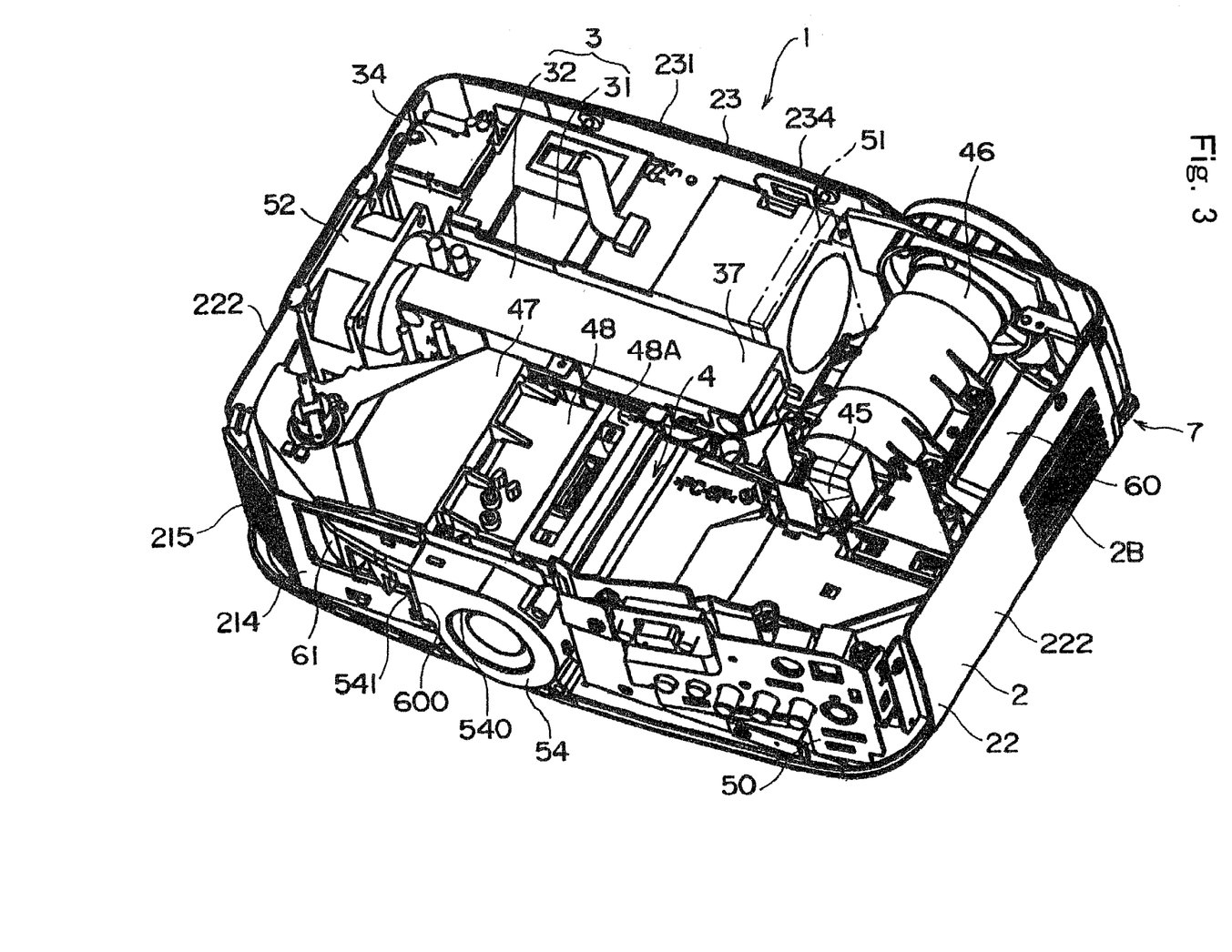
FIG. 3 is a perspective view of the projector showing the inside thereof.

Referring now to FIGS. 1 to 3, the projector 1 includes a substantially rectangular box-shaped outer case 2, a power supply unit 3 accommodated inside the outer case 2, and an optical unit 4 also arranged inside the outer case 2 in a planar L-shaped configuration when viewed vertically.

Figure 4:
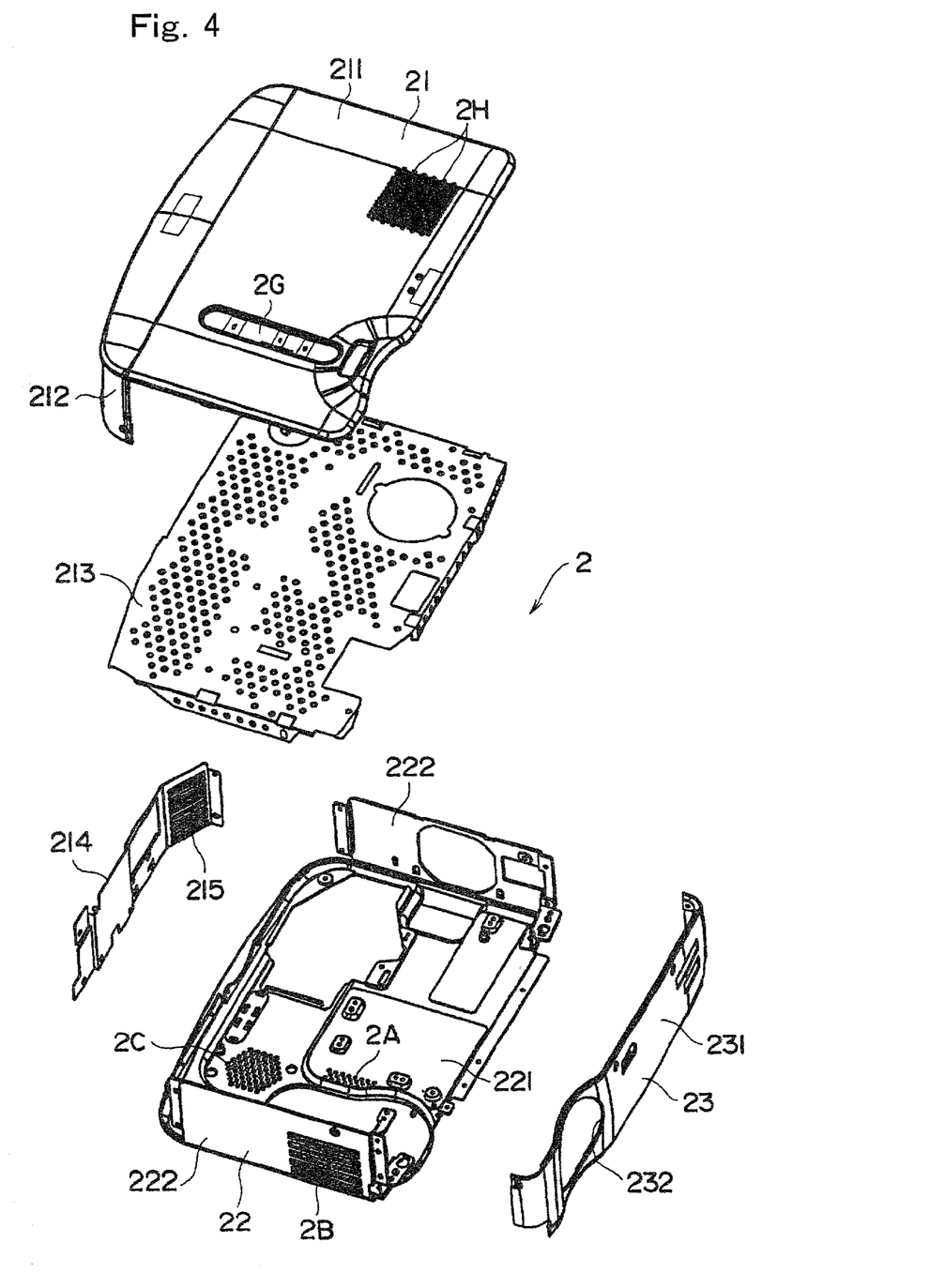
FIG. 4 is an exploded perspective view of an outer case according to the embodiment.

The outer case 2, as shown in FIG. 4, is formed of an upper case 21 made of a synthetic resin, a lower case 22 made of a metal, such as aluminum, and a front case 23 also made of a metal, such as aluminum, which are fixed to each other with screws.

The upper case 21 is constructed of a top-face part 211 and a back-face part 212 in a body.

A first electromagnetic shielding member 213, which is formed of an aluminum plate and perforated by punching, is detachably arranged inside of the top-face part 211. A second electromagnetic shielding member 214, which is formed of an aluminum plate, is also arranged inside of the back-face part 212 of the upper case 21. The second electromagnetic shielding member 214 is fixed to the lower case 22 with screws.

The lower case 22 is constructed of a bottom-face part 221 and a pair of side-face parts 222 opposing each other in a body. By bending an aluminum plate, for instance, processed by a press or machining center in a predetermined shape, the bottom-face part 221 and the side-face parts 222 are bent with each other.

Height/position-adjustment mechanisms 7 that position projected images by adjusting inclination of the entire projector 1 are arranged in both corner portions of the front of the bottom-face part 221. On the other hand, only a foot member 6 (see FIG. 2), made of a resin, is fitted in the center of the bottom-face part 221 in the rear side.

The front case 23 is a member that forms a front-face part 231 of the outer case 2, which is constructed by bending or drawing an aluminum plate that is also processed by a press or machining center in a predetermined shape. The front case 23 is provided with a round opening 232 formed correspondingly to a projecting lens 46, the periphery of which is curved inside by drawing.

Such an outer case 2 is provided with inlet holes 2A, 2B, 2C, 2D, and 2E for in-taking cooling air, an exhaust port 2F that exhausts the cooling air from the inside, an operating panel 2G, and a number of holes 2H formed correspondingly to a position of a speaker.

The power supply unit 3 includes a primary power supply 31 arranged in the front-face side of the outer case 2 (FIG. 3) and a ballast 32 arranged in the rear of the primary power supply 31. The primary power supply 31 supplies electric power supplied via a power supply cable to the ballast 32 as well as to a driver board (electronic circuit-board) (not shown), and includes an inlet connector 33 to which the power supply cable (FIG. 2) is to be inserted, an aluminum frame 34 surrounding the periphery, and a power supply circuit board 35 (FIG. 9).

Figure 9:
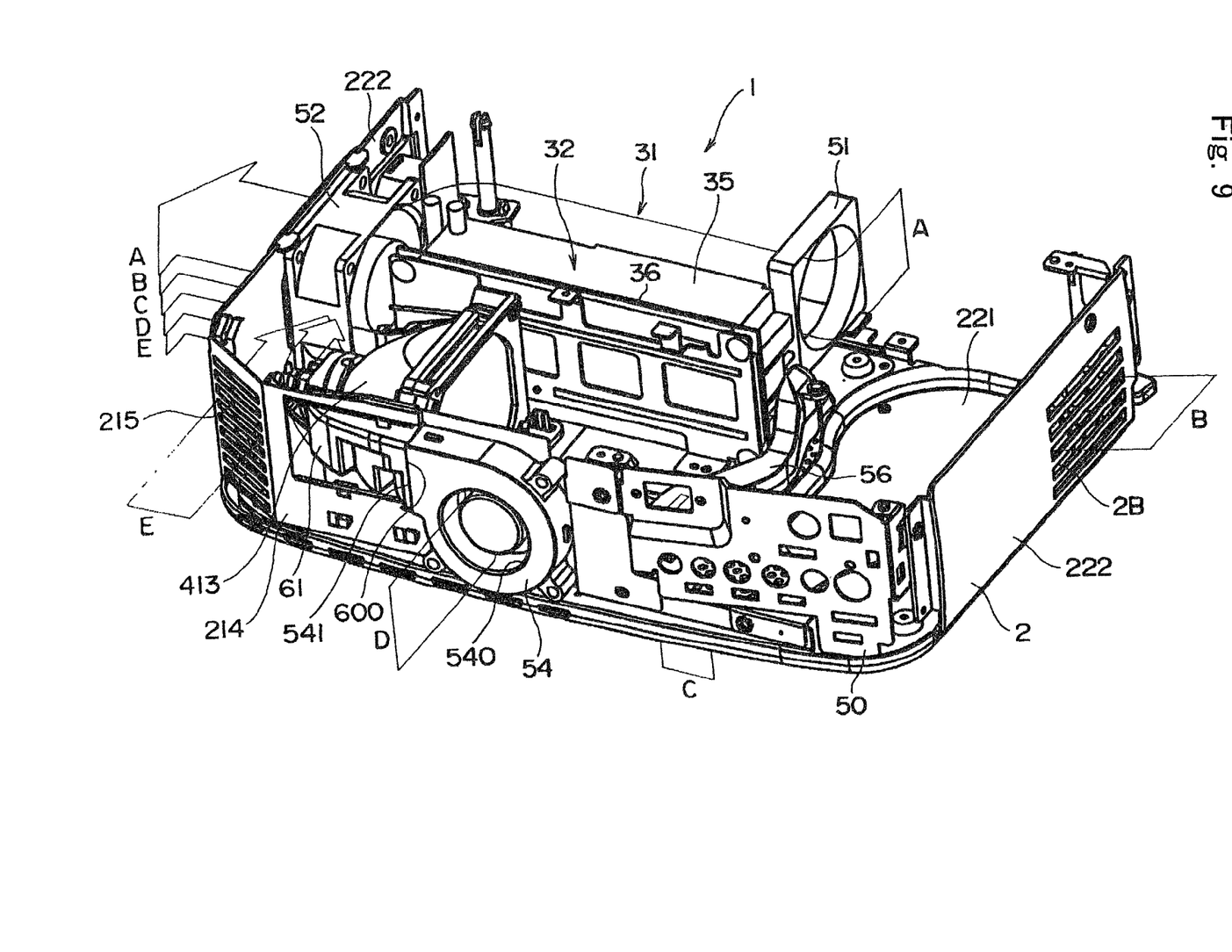
FIG. 9 is a perspective view showing a cooling system according to the embodiment of the invention.

The ballast 32 supplies electric power mainly to a light-source lamp 411 (FIG. 5) of the optical unit 4, and includes a lamp-driving circuit board 36 (FIG. 9).

Figure 5:
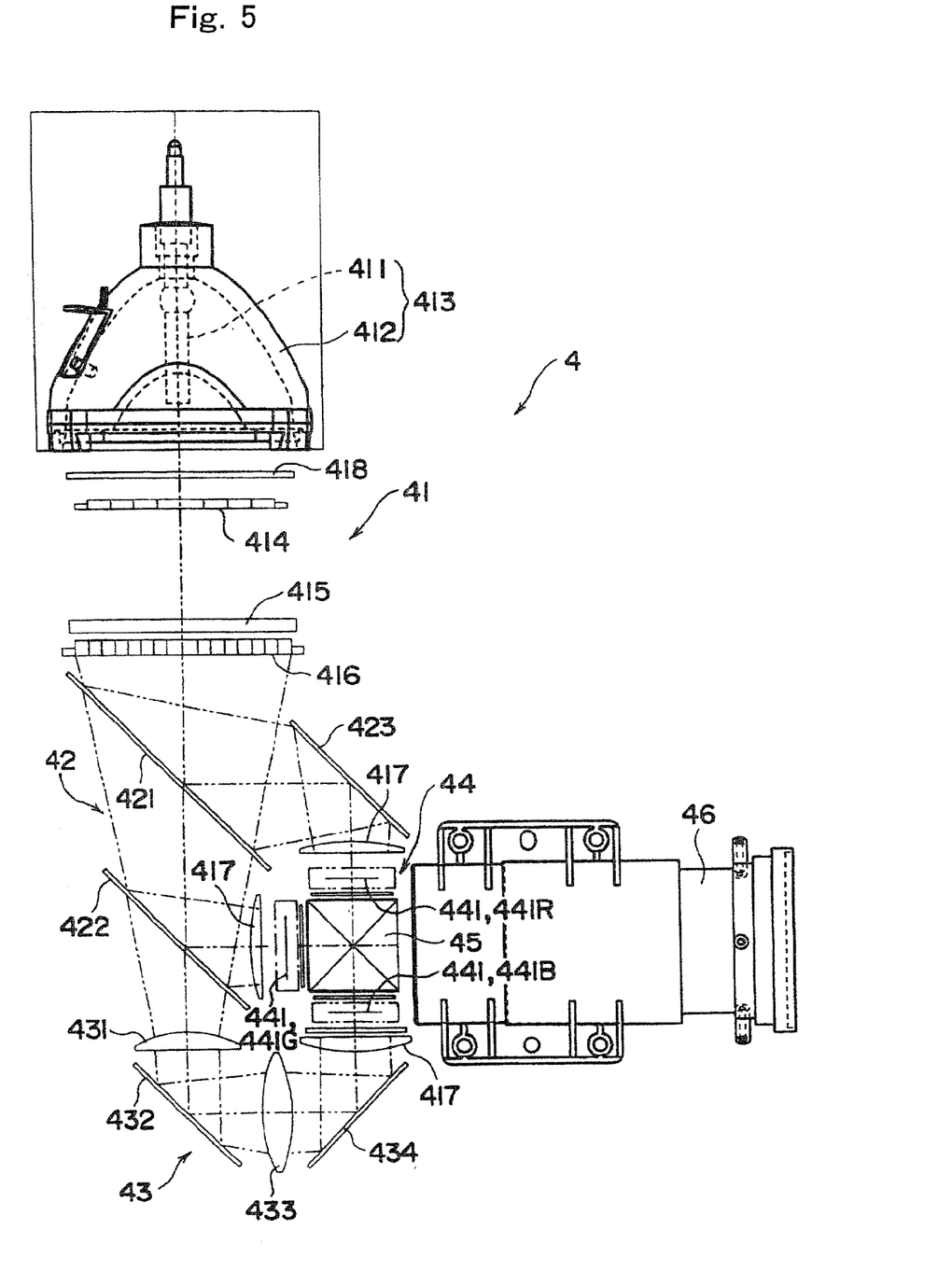
FIG. 5 is a plan view schematically showing each optical system of the projector.

The optical unit 4, as shown in FIG. 5, includes an integrator-illumination optical system 41, a color-separation optical system 42, a relay optical system 43, an electro-optical device 44, a cross-dichroic prism 45 as a color-composition optical system, and a projection lens 46 as a projection optical system.

Referring now to FIG. 5, the integrator-illumination optical system 41 includes the light-source lamp 411, such as a metal halide lamp, a light source device 413 including a reflector 412, a first lens array 414, a polarization-conversion element 415, and a second lens array 416. Luminous flux emitted from the light source lamp 411 is reflected so as to be condensed at a light-condensing point by the reflector 412, and then is separated into the plurality of partial luminous flux by the first lens array 414, which is arranged at an intermediate position to the light-condensing point. Then, the plurality of partial luminous flux is transformed into one kind of polarized light by the polarization-conversion element 415 so as to enter the second lens array 416.

Such a polarization-conversion element 415 is disclosed in Japanese Unexamined Patent Application Publication No. 8-304739, for example.

Each partial luminous flux transformed into one kind polarized light by the polarization-conversion element 415 is condensed on a condenser lens 417, and finally superimposed substantially on a liquid crystal panel 441 (referred to as liquid crystal panels 441R, 441G, and 441B for each color) as three light modulators (light valves) forming the electro-optical device 44.

The color-separation optical system 42 includes two cross-dichroic mirrors 421 and 422 and a reflection mirror 423, and has a function to separate the plurality of partial luminous flux emitted from the integrator-illumination optical system 41 into three colored rays of red, green, and blue by the mirrors 421 and 422.

The relay optical system 43 includes an incident-side lens 431, a relay lens 433, and reflection mirrors 432 and 434, and has a function to lead the colored ray separated by the color-separation optical system 42, for example, the blue ray to the liquid crystal panel 441B.

The electro-optical device 44 includes liquid crystal panels 441R, 441G, and 441B, which are to be three light modulators and which use a poly-silicon TFT, for example, as a switching element. The respective colored rays, separated by the color-separation optical system 42, are modulated correspondingly to image information by the three liquid crystal panels 441R, 441G, and 441B to form optical images.

The cross-dichroic prism 45 forms images, which are modulated for each colored ray emitted from the three liquid crystal panels 441R, 441G, and 441B, so as to form color images. In addition, in the dichroic prism 45, a dielectric multi-layer film that reflects a red light beam and a dielectric multi-layer film that reflects a blue light beam are formed along the four surfaces of the right-angle prism to have a substantially X-shape. Three colored rays are formed by these dielectric multi-layer films. The color image formed in the dichroic prism 45 is emitted from the projection lens 46 so as to be magnified and projected on a screen.

Figure 6:
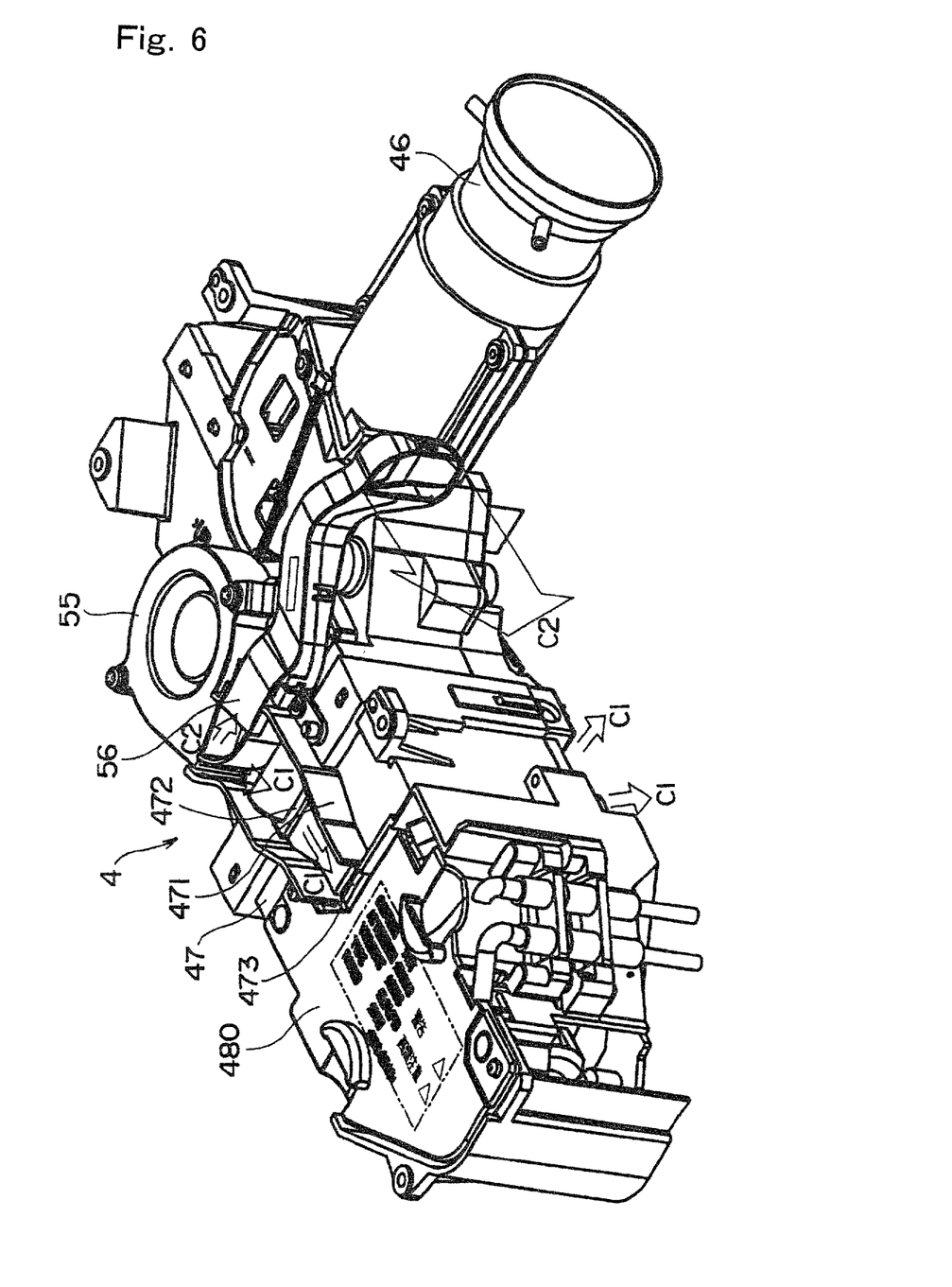
FIG. 6 is a perspective view of an optical unit of the projector showing members forming the optical unit.

The optical systems 41 to 45 described above are accommodated within a light guide 47 made of a synthetic resin as a supporting member, shown in FIG. 6. That is, the light guide 47 is provided with the plurality of grooves (not shown), into which the above-mentioned optical components 414 to 416, 421 to 423, 431 to 434 are slidingly fitted from the upper part, as well as a light-source protector (not shown) that covers the light-source device 413. The polarization-conversion element and the second lens array, both of which are integrated into one piece, are to be fitted into one groove. The dichroic prism 45 (see FIGS. 3 and 7) is fixed to the light guide 47, and a cover 48 (see FIG. 3) is also attached.

Referring to FIGS. 1 and 2, within the projector 1, there are provided a first cooling system A, in which the cooling air received from the side of the projection lens 46 and an air-inlet 2A formed on the bottom of the outer case 2 is exhausted from an air-outlet 2F, a second cooling system B in which the cooling air received from an air-inlet 2B formed on a side-face of the outer case 2 is exhausted from the air-outlet 2F, a third cooling system C in which the cooling air received from an air-inlet 2C formed on the bottom of the outer case 2 is exhausted from the air-outlet 2F, a fourth cooling system D in which the cooling air received from an air-inlet 2D formed on a side-face of the outer case 2 is exhausted from the air-outlet 2F via a cooling passage according to the present invention, which is formed of a sirocco fan 54 as a centrifugal fan to be described below, and an air intake duct 60, and a fifth cooling system E in which the cooling air received from an air-inlet 2E formed in the vicinity of the corner of a side-face of the outer case 2 is exhausted from the air-outlet 2F via a louver 215 of the second electromagnetic shielding member 214.

However, flow of cooling air cannot be clearly divided into the cooling systems A to E, and in fact, movement of cooling air among the cooling systems A to E occurs inevitably to some extent via clearances between internal elements, etc.

As is shown in FIG. 9 in detail, in the first cooling system A, an axial-flow in-take fan 51 (shown by the alternate long and short dash lines in FIG. 3) is arranged in the side of the projection lens 46 of the main power-supply 31, while an axial-flow exhaust fan 52 is arranged in the ballast 32 toward the light-source device 413. The cooling air taken from the side of the projection lens 46 and the air-inlet 2A by driving the axial-flow exhaust fan 52 is exhausted outside the outer case 2 by the axial-flow exhaust fan 52 after cooling the power-supply circuit board 35 (including mounted circuit-components) of the main power-supply 31.

Figure 7:
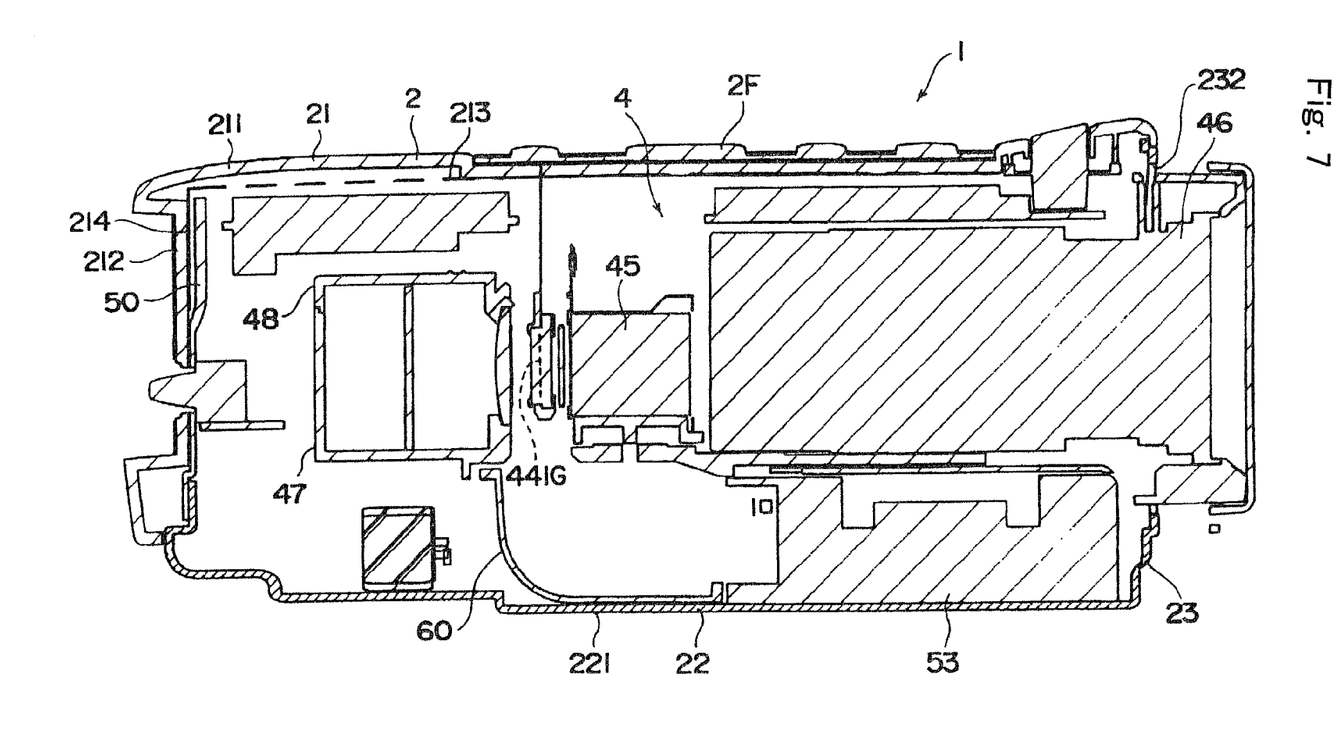
FIG. 7 is a longitudinal sectional view as viewed in the direction of arrows VII—VII in FIG. 1.
Figure 8:
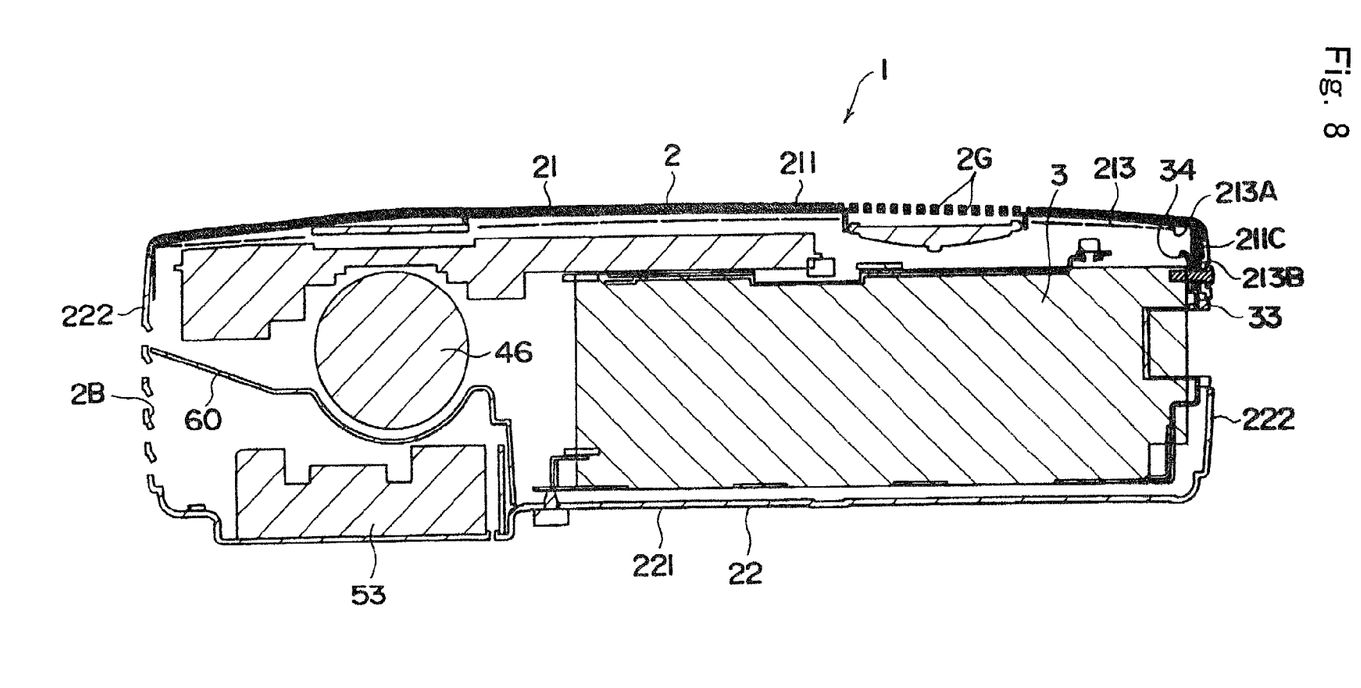
FIG. 8 is a longitudinal sectional view as viewed in the direction of arrows VIII—VIII in FIG. 1.

In the second cooling system B, as shown in the sectional views of FIGS. 7 and 8, a first sirocco fan 53 is arranged underneath the projection lens 46. The first sirocco fan 53 is placed in the intermediate portion within an air intake duct 60 (FIG. 7) to introduce cooling air from the air-inlet 2B toward the lower part of the electrical optical system 44.

The air received from the air-inlet 2B is introduced into the air-intake duct 60 so as to be further received by the first sirocco fan 53; then, it cools the electrical optical system 44 after being discharged along the bottom surface of the outer case 2. Subsequently, the cooling air proceeds toward the axial-flow exhaust fan 52 so as to be exhausted from the air-outlet 2F by the axial-flow exhaust fan 52 while cooling the driver board (not shown) as a circuit board arranged in the upper part in a flatted state.

In the third cooling system C, as shown in FIG. 6, a second sirocco fan 55 is arranged at a position on the bottom surface of light guide 47 corresponding to the air-inlet 2C on the bottom face of the outer case 2. In addition, the air-inlet 2C has individual holes defining diameters that are as small as possible, such that dust on the set-up place of the projector 1 is difficult to be sucked into the holes.

A part of the cooling air, received into the second sirocco fan 55 from the air-inlet 2C, is exhausted toward the light-source device 413 via a duct-like section 471 formed between the bottom surface of outer case 2 and the lower surface of the light guide 47. Then, it is introduced into air-intake holes 472 and 473 (see FIG. 6) so as to cool a UV filter 418 from the lower to upper part as well as the above-mentioned unit, which is placed above the air-intake holes 472 and 473 and which is formed of the first lens array 414, the polarization-conversion element 415, and the second lens array 416. Then, the cooling air, as indicated by an arrow C1 in FIG. 6, is exhausted from an opening for exhaust 48A (FIG. 3) of the cover 48; and the cooling air is finally exhausted to the exterior from the air-outlet 2F by the axial-flow exhaust fan 52. In addition, on the bottom face of the duct-like section 471, a sheet (not shown) is bonded to form a duct.

The other part of the cooling air received into the second sirocco fan 55 from the air-inlet 2C, as indicated by an arrow C2 in FIG. 6, is exhausted toward the lamp-driving circuit 32 via the inside of a cooling duct for the lamp-driving circuit 56.

Figure 10:
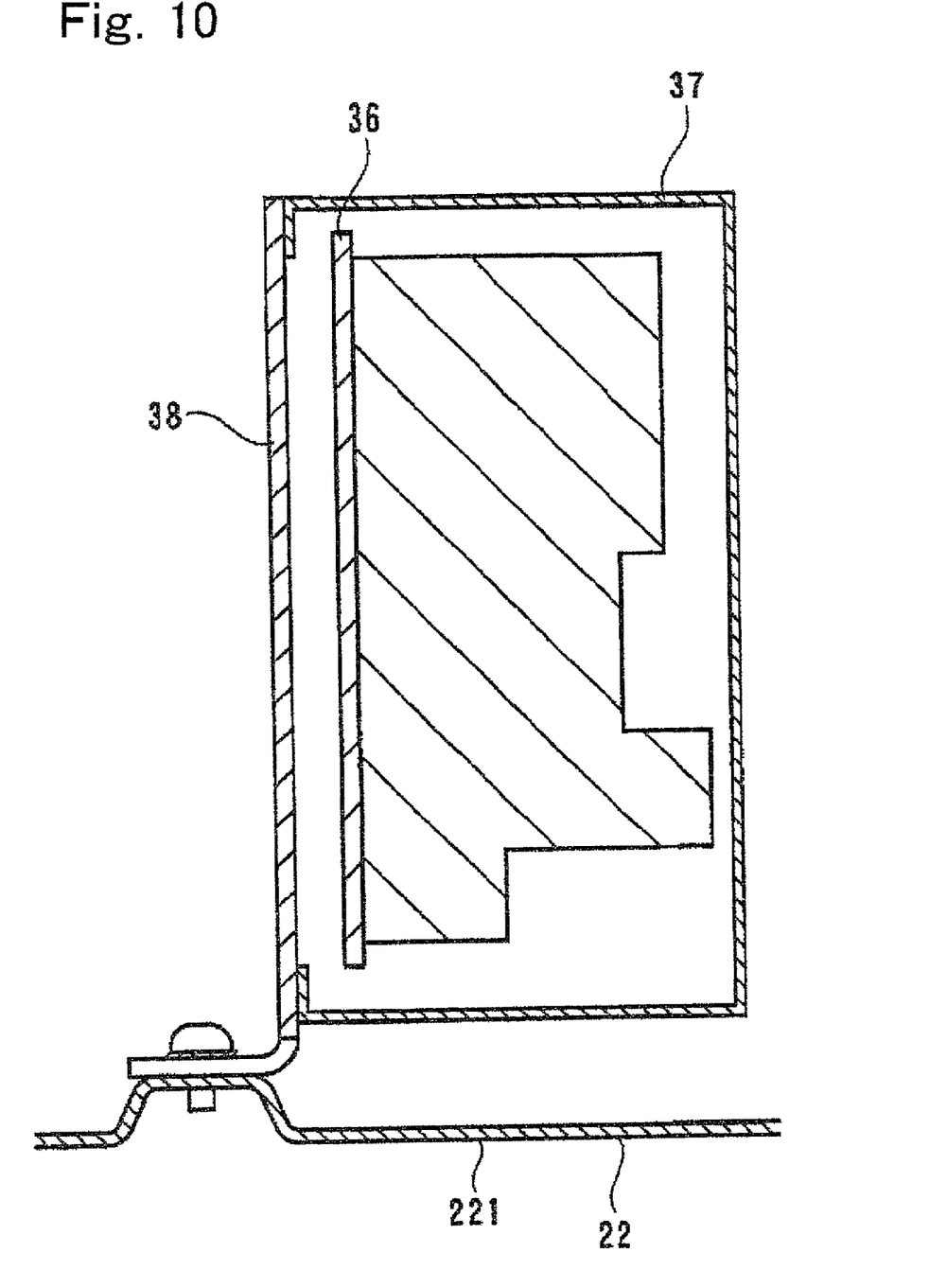
FIG. 10 is an enlarged longitudinal sectional view of a significant part of the embodiment of the invention.

At this time, the lamp-driving circuit 36, as shown in FIGS. 3 and 10, is accommodated within a case member 37 made of a transparent resin to ensure the safety, and is fixed to a base member 38 via a stud member (not shown). The cooling air from the cooling duct for the lamp-driving circuit 56 flows in an opening at one end of the case member 37 and flows out of an opening at the other end so as to be drawn in the axial-flow exhaust fan 52 and exhausted.

In the fourth cooling system D, as shown in FIGS. 3, 6, and 9, the third sirocco fan 54, which is a centrifugal fan, is arranged on a side face of the second electromagnetic shielding member 214 in a manner that an inlet 540 of the third sirocco fan 54 faces the air inlet 2D of the outer case 2, while an outlet 541 thereof faces a side face 222 of the lower case 22, on which the axial-flow exhaust fan 52 is attached.

Figure 11:
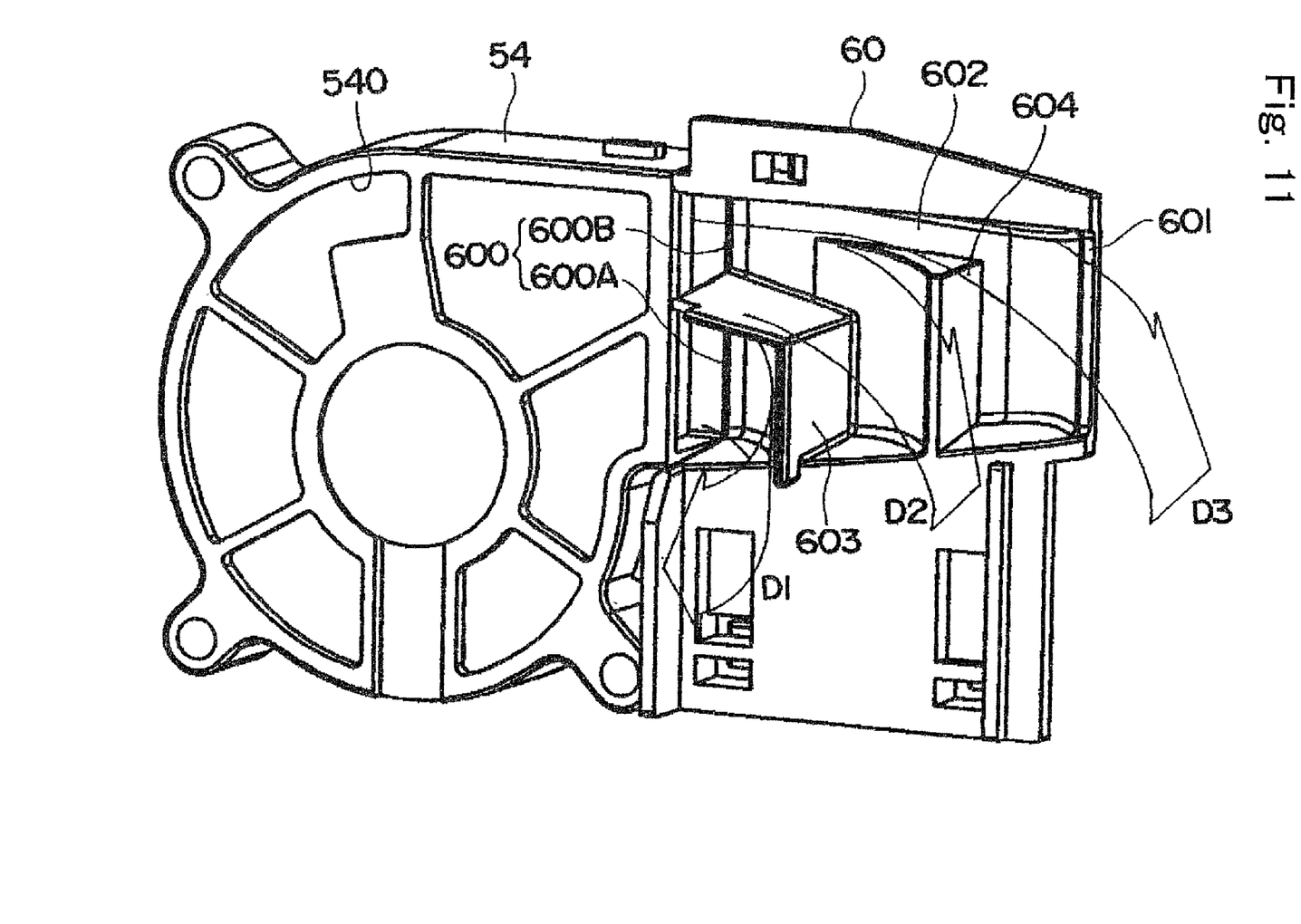
FIG. 11 is a perspective view of the embodiment of the invention as viewed from the backside of a cooling duct.
Figure 12:
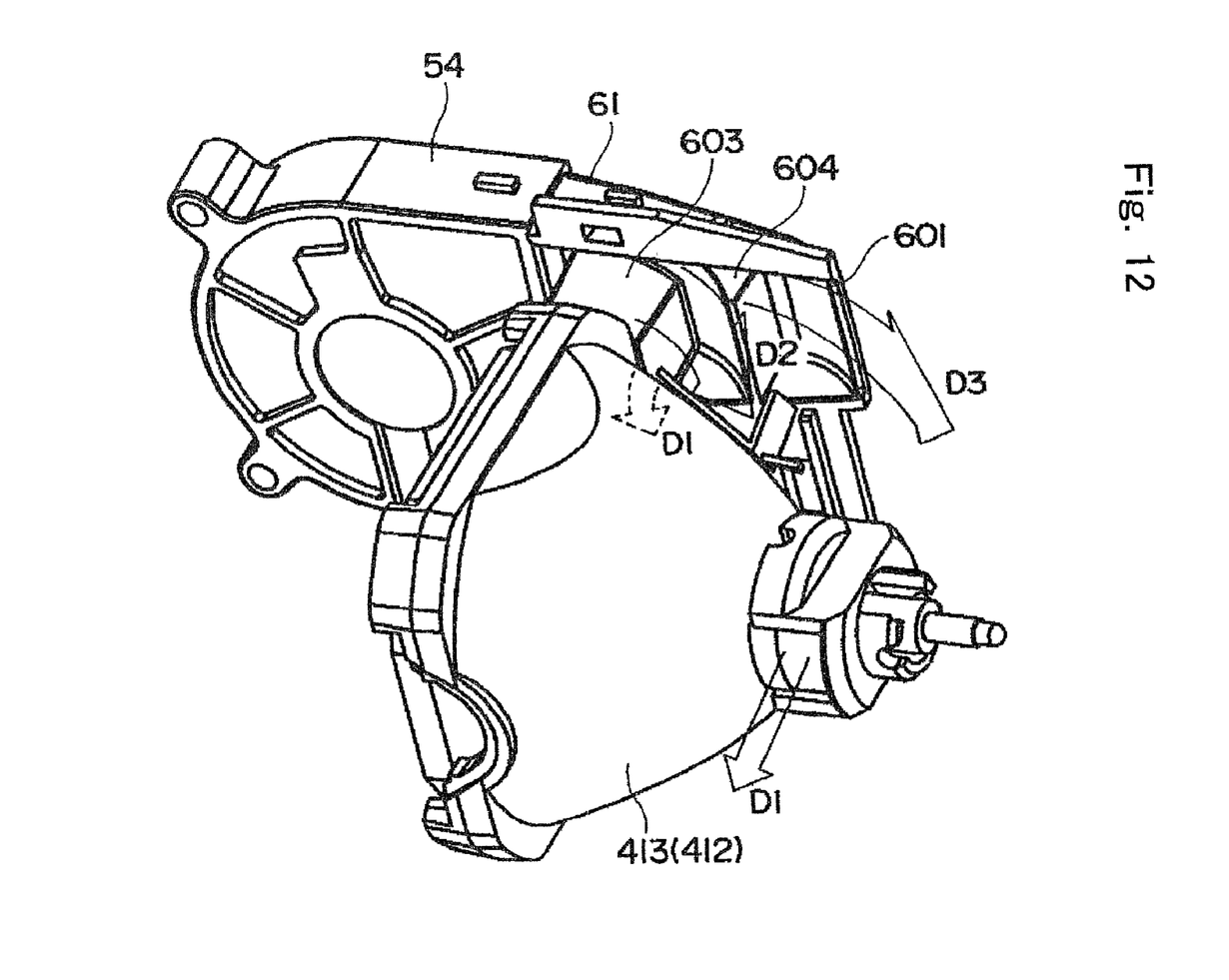
FIG. 12 is a perspective view showing the relationship between the cooling duct and a light source device according to the embodiment of the invention.

As shown in FIGS. 11 and 12, a cooling air intake 600 of a cooling duct 61 to cool the lamp and a case is connected to the outlet 541 of the third sirocco fan 54, while a blow-off hole 601 of the cooling duct 61 is formed to have a long thin groove-shaped opening tapered relative to the cooling air intake 600 so as to readily blow cooling air to the inside of the outer case 2 directly. A cooling passage is formed by the cooling air blown from the cooling duct 61.

The cooling air intake 600 of the cooling duct 61 is divided into two directions so that a cooling air passage is separated into a first passage 600A and a second passage 600B.

A substantially box-like first guide section 603 opened toward the light source lamp 411, and a second guide section 604 formed to be substantially dustpan-shaped and opened toward the light source lamp 411, are arranged inside of the cooling duct 61 between the cooling air intake 600 and the blow-off hole 601 at fixed spacing. The first guide section 603 is a guide section according to the present invention to guide cooling air to the inside and periphery of the light source device 413, and is arranged in a manner such that one side face of the first guide section 603 is located in the branch between the first passage 600A and second passage 600B.

The width of the second guide section 604 is slightly larger than the width of the first guide section 603. Therefore, the space between a side wall 604A of the second guide section 604 and a side wall of the cooling duct 61 opposing the side wall 604A is smaller than the sizes of the first passage 600A and the blow-off hole 601 of the cooling duct 61. That is, a restrictor 602 is formed in the upstream side of the blow-off hole 601 of the cooling duct 61.

As shown in FIG. 12, the cooling duct 61 is constructed in a manner such that openings of the first and second guide sections 603 and 604 face the side of the light source device 413. The first guide section 603 forms a cooling system D1 in that the cooling air from the first passage 600A is fed via a hole (not shown) formed on a side face of the light source device 413 in the side of the reflector 412 to cool the inside of the reflector 412, and then is exhausted from a hole 412B in a root portion of the reflector 412. In addition, holes 412A and 412B are provided with nets (not shown) to prevent fragments from scattering when the lamp is broken.

In the second guide section 604, the cooling air from the second passage 600B is divided into a cooling system D2 to cool the outer peripheral portion of the reflector 412 of the light source device 413 and a cooling system D3 to cool the inside of the outer case 2.

In the fifth cooling system E, as shown in FIGS. 2, 3, and 9, the cooling air received from the air-inlet 2E of the outer case 2 is fed toward the axial flow fan 52 via the louver 215 as mentioned above, following the cooling air flow of the cooling system D3, and then is exhausted by the axial flow fan 52.

The cooling air from the exterior of the apparatus, which is received by the third sirocco fan 54 disposed on an internal side face of the outer case 2 and in the vicinity of the light source device 413, is directly blown out of the blow-off hole 601 of the cooling duct 61 with the blow-off hole 601 facing the inside of the outer case 2, so that a portion of the outer case 2, which is most liable to reach a high temperature, is intensively cooled, resulting in effective cooling of the outer case 2.

As described above, the cooling air blown out of the third sirocco fan 54, which is disposed on an internal side face of the outer case 2 and in the vicinity of the light source device 413, via the cooling duct 61, cools the light source device 413 efficiently as well as the outer case 2, so that a temperature rise in the light source device 413 can be restrained, resulting in restraining a temperature rise in the outer case 2, thereby enabling the outer case 2 to be cooled more efficiently.

The blow-off hole 601 of the cooling duct 61 has a long thin groove-shaped opening in a form such that the cooling air passing therethrough becomes utilized by the cooling system D3, in which the cooling air is directly blown on an internal side face of the outer case 2 and in the vicinity of the light source device 413, so that the outer case 2 is more efficiently cooled.

The restrictor 602 is formed in the upstream side of the opening (blow-off hole 601) of the cooling duct 61 and throttles the cooling air flowing from the second inlet 600B, so that blast pressure increases, enabling the cooling air to be forcefully blown to the inside of the outer case 2 to efficiently cool the outer case 2.

The first passage 600A from the cooling air inlet 600 of the cooling duct 61 serves to cool the inside of the light source lamp 411 of the light source device 413, while the second passage 600B is capable of cooling the outer peripheral portion of the reflector 412 of the light source device 413 and the inside of outer case 2, so that the outer case 2 is cooled along with the light source lamp 411 and the reflector 412 of the light source device 413. Therefore, a temperature rise in the light source device 413 can be restrained, resulting in restraining a temperature rise in the outer case 2 and enabling the outer case 2 to be cooled more efficiently.

Since the cooling duct 61 is formed integrally with the first guide section 603 that leads cooling air to the inside and outer peripheral portion of the light source device 413, the cooling air is securely led to the inside and periphery of the light source device 413. Therefore, the light source device 413 is certainly cooled, so that the heat from the light source device 413 is not transmitted to the outer case 2, thereby preventing the outer case 2 from being heated.

Since the air-inlet 2E that receives external cooling air is arranged on a side face of the outer case 2 and in the vicinity of the cooling air intake 600 of the cooling duct 61, the cooling air is also received from the air-inlet 2E and flows so as to follow the cooling passage from the cooling duct 61, so that the air volume increases, thereby enabling the outer case 2 to be cooled more efficiently.

The third sirocco fan 54 is arranged on a side face of the outer case 2 in the vicinity of the cooling air intake 600 of the cooling duct 61 and also is connected to the cooling air intake 600 of the air intake duct 60, and cooling air is fed from the third sirocco fan 54 to the cooling duct 61. Therefore, the air can be forcefully blown, enabling the outer case 2 to be cooled more efficiently.

The third sirocco fan 54 is connected to the cooling duct 61 and also arranged on a side face of the outer case 2, while the axial flow exhaust fan 52 is arranged on a side face perpendicular to the side face of the outer case for exhausting the cooling air that has been received from the sirocco fan 54 and the cooling duct 61 and cooled the outer case, so that the cooling passage is more securely formed, thereby performing the exhausting rapidly and the cooling more efficiently.

The second guide section 604 is formed to be substantially dustpan-shaped so as to lead the first passage 600B toward the light source device 413 and an internal side face of the outer case 2, and the restrictor 602 is formed between a side face of the second guide section 604 and a side face of the air intake duct 60. Therefore, a specific member is not required to form the restrictor 602 and instead one member has two functions, resulting in reducing the number of members that are required.

In addition, the present invention is not limited to the embodiment described above. Other structures that are capable of achieving the object of the present invention are intended to be covered thereby. A few modifications that are also intended to be covered by the invention are provided below merely for exemplary purposes.

For example, the outer case 2 is provided with the third sirocco fan 54 and the cooling duct 61 is connected to the third sirocco fan 54 in the present embodiment; however, only the cooling duct 61 may be provided. In this case, the cooling air intake of the cooling duct 61 may be opposed to the outside of the outer case 2 so as to readily take cooling air therein.

In the embodiment, the second passage 600B is led to the periphery of the light source device 413 and the internal side face of the outer case 2 by the second guide section 604; however, the second guide section 604 may not necessarily be provided, and the cooling air from the second passage 600B may directly proceed toward the internal side face of the outer case 2 so as to cool the periphery of the light source device 413 along its path. In this case, a restrictor may be arranged in an intermediate portion of the flow.

Furthermore, a projector using three light modulators is taken as an example in the embodiment; however, the present invention may be applied to a projector only using one light modulator, a projector using two light modulators, or a projector using four or more light modulators. Also, in the embodiment, a liquid crystal panel is used as a light modulator; however, a light modulator other than the liquid crystal panel, such as a device using a micro-mirror, may be used. Moreover, in the embodiment, a transmission-type light modulator in which the light-incident plane is different from the light-emitting plane is used; however, a reflection-type light modulator, in which the light-incident plane is equal to the light-emitting plane, may be used. Furthermore, in the embodiment, the front-type projector, in which projection is performed from a viewing direction of a screen, is only described as an example. The present invention may also be applied to a rear-type projector in which the projection is performed from a direction that is opposite to the viewing discretion of the screen.

As described above, according to the present invention, since a cooling passage to cool an outer case is formed in the vicinity of a light source lamp of a light source device in the outer case accommodating the light source device, a portion of the outer case in the vicinity of the light source lamp, which is most liable to reach a high temperature, is cooled by the cooling passage, resulting in effective cooling of the outer case.

Since the cooling passage is arranged in the vicinity of the light source lamp, the light source lamp is also cooled efficiently, thereby enabling the outer case to be more efficiently cooled.

What is claimed is:

1. A projector, comprising:
   a light source device, luminous flux emitted from the light source device being magnified and projected so as to form a projected image after being modulated;
   an outer case that accommodates the light source device; and
   a cooling passage that cools the outer case and the light source device formed in a vicinity of the light source device in the outer case, the cooling passage being formed by cooling air being blown out of a cooling duct arranged inside the outer case, a cooling air inlet hole of the cooling duct being capable of taking cooling air from the exterior of the outer case, and a discharge hole of the cooling duct having an opening formed to directly blow the cooling air on an internal side face of the outer case, the cooling air inlet hole of the cooling duct being divided into two directions by a first passage and a second passage, the first passage cooling an inside of a light source lamp of the light source device, while the second passage being capable of cooling an outer peripheral portion of the light source lamp and the internal side face of the outer case.

2. The projector according to claim 1, further including a restrictor formed in an upstream side of the opening of the cooling duct.

3. The projector according to claim 1, the cooling duct being provided with a guide section formed in one piece to lead the cooling air to the inside and the outer peripheral portion of the light source lamp of the light source device.

4. The projector according to claim 1, further including an air inlet hole that receives external cooling air being formed on a side face of the outer case and in the vicinity of the cooling air inlet hole of the cooling duct.

5. The projector according to claim 1, further including a centrifugal fan which is connected to the cooling duct in the side of the cooling air inlet hole.

6. The projector according to claim 5, the centrifugal fan being a sirocco fan disposed on an internal side face of the outer case, and further including an exhaust fan arranged on a side face perpendicular to the internal side face of the outer case that exhausts cooling air that has been received from the sirocco fan and the cooling duct and that has cooled the outer case.

* * * * *